United States Patent [19]

Mayer, Jr. et al.

[11] 4,202,626
[45] May 13, 1980

[54] SIGNATURE VERIFICATION AND AUTHENTICATION SYSTEMS

[75] Inventors: George L. Mayer, Jr., New Orleans, La.; John D. Schick, San Francisco, Calif.

[73] Assignee: A Patent Partnership, New Orleans, La.

[21] Appl. No.: 880,805

[22] Filed: Feb. 24, 1978

[51] Int. Cl.² .............................................. G03B 27/68
[52] U.S. Cl. ..................... 355/52; 350/3.77; 355/77; 355/132; 283/11; 283/17
[58] Field of Search ..................... 355/52, 133, 77, 45, 355/46; 346/107 R, 76 L; 354/120, 123; 283/11, 7, 17; 340/146.3 F, 146.3 G, 146.3 P, 146.3 Z, 146.3 SY, 149 A; 350/3.77

[56] References Cited

U.S. PATENT DOCUMENTS

| | | | |
|---|---|---|---|
| 2,785,388 | 3/1957 | McWhirter et al. | 340/149 R |
| 3,166,625 | 1/1965 | Brumley | 350/167 |
| 3,178,993 | 4/1965 | Ferris et al. | 350/167 |
| 3,245,697 | 4/1966 | Nugent | 283/7 |
| 3,579,186 | 5/1971 | Johnson et al. | 340/146.3 E |
| 3,610,120 | 10/1971 | Morse et al. | 355/45 X |
| 3,620,590 | 11/1971 | Barker | 350/3.68 |
| 3,676,000 | 7/1972 | Mayer, Jr. et al. | 355/52 |
| 3,781,109 | 12/1973 | Mayer, Jr. et al. | 355/52 |
| 3,806,704 | 4/1974 | Shinal | 235/380 |
| 3,937,565 | 2/1976 | Alasia | 354/123 X |
| 3,938,091 | 2/1976 | Atalla et al. | 340/149 A |
| 3,955,178 | 5/1976 | Warfel | 340/146.3 SY |
| 4,023,902 | 5/1977 | Ungerman | 355/52 |
| 4,140,373 | 2/1979 | Rüll | 350/3.77 |

OTHER PUBLICATIONS

"The Codebreakers-The Story of Secret Writing", Kahn, Macmillan Co., N.Y., 1968, pp. 828-836.
"Automatic Digital Computers", Wilkes, John Wiley & Sons, Inc., 1956, pp. 230-233.
"Designing with TTL Integrated Circuits", Texas Instruments Inc., Morris & Miller, McGraw Hill, 1971, pp. 139-154.

*Primary Examiner*—Richard A. Wintercorn
*Attorney, Agent, or Firm*—Schapp and Hatch

[57] ABSTRACT

Signature verification and authentication systems are disclosed which include documents each of which bears a cryptographic representation of at least one property of a signature of an authorized user thereof modified in accordance with at least one of a set of indicia identifying the document with its authorized user. Apparatus are disclosed whereby said cryptographic representations can be decrypted and authenticated, using said indicia as a key. Apparatus are disclosed for producing such cryptographic representations on documents, which apparatus include cryptographic means for producing cryptographic representations of signatures and means for modifying the operation of these cryptographic means in accordance with one or more of said indicia. Methods of signature verification and authentication using documents bearing such cryptographic representations are disclosed. Both passive systems in which the decrypting of said cryptographic representations is performed by eye with the help of passive optical elements, and active systems in which electronic means are used for the decrypting of said cryptographic representations are disclosed.

56 Claims, 14 Drawing Figures

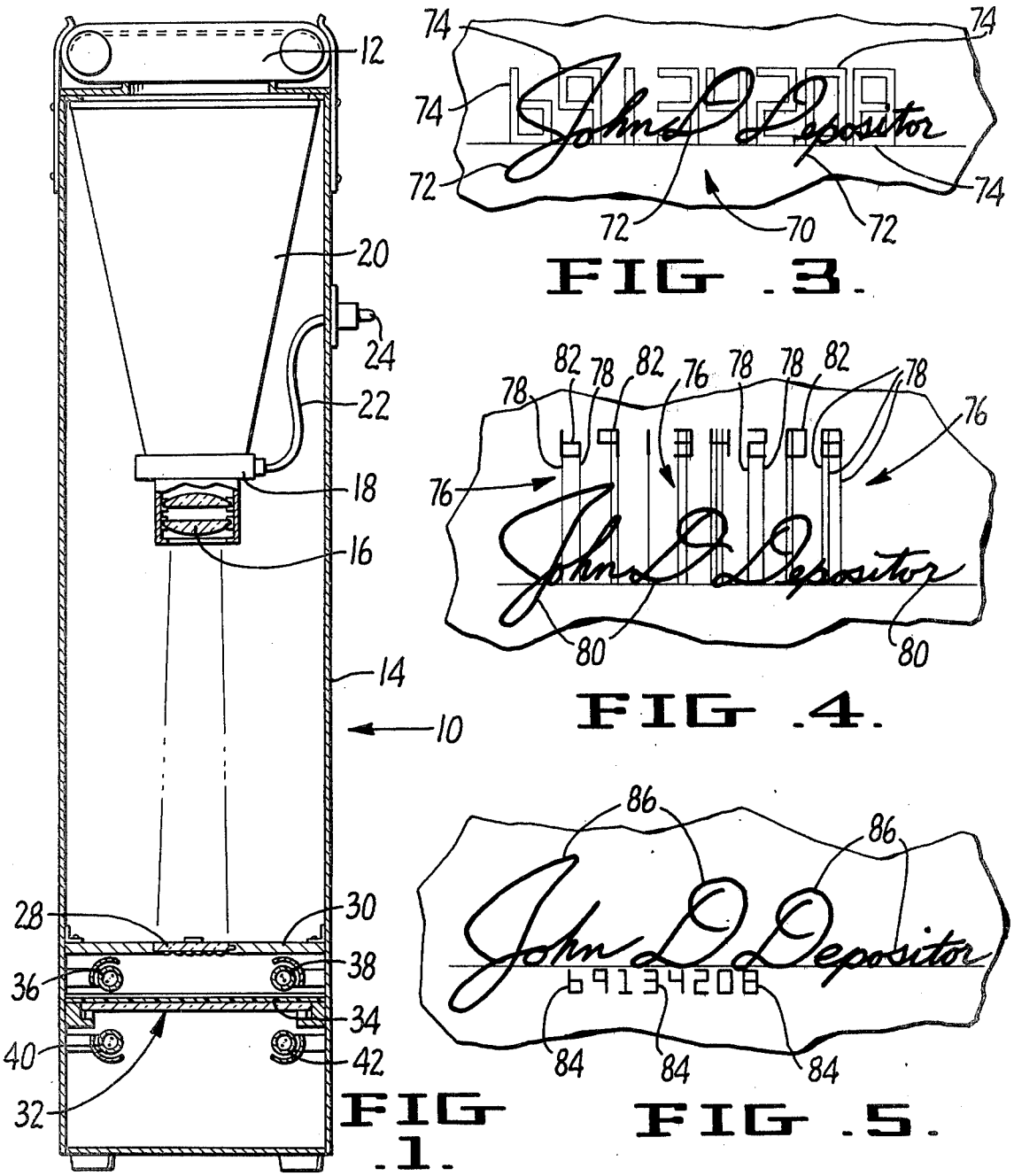

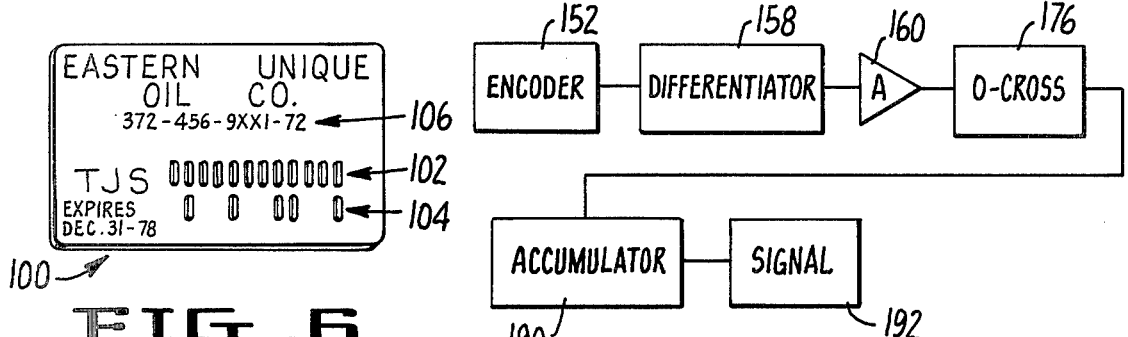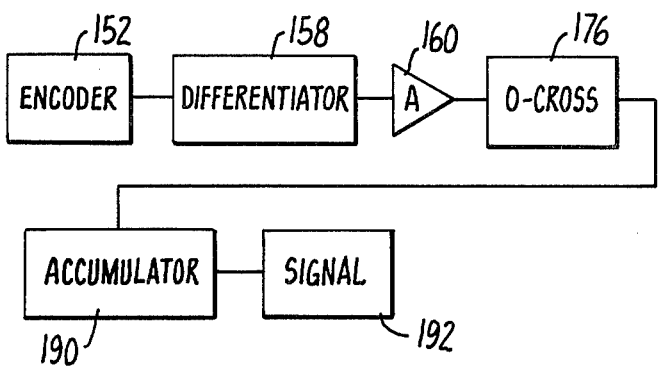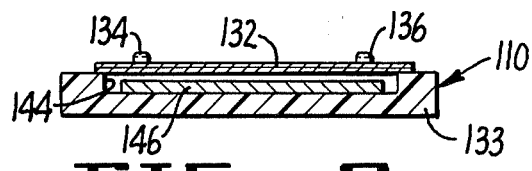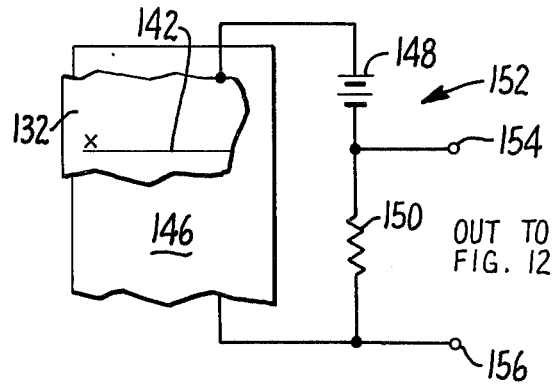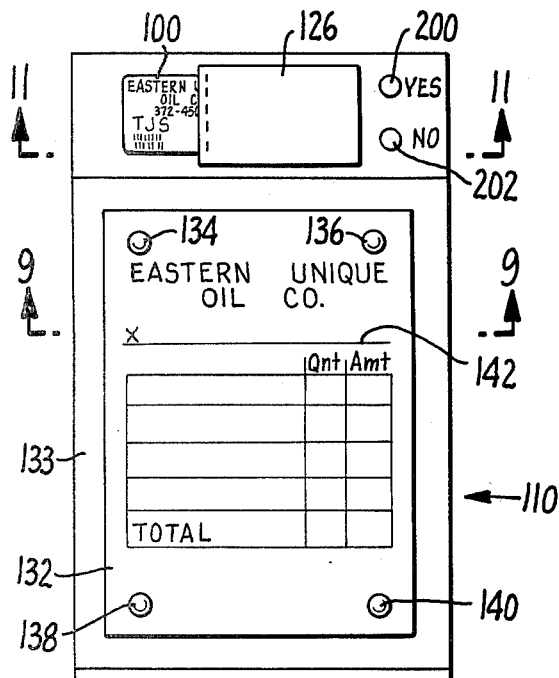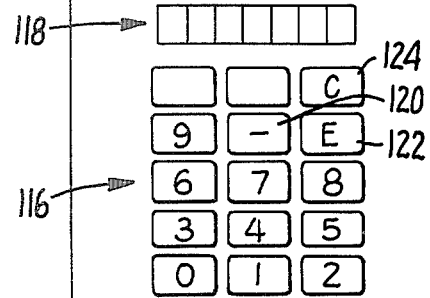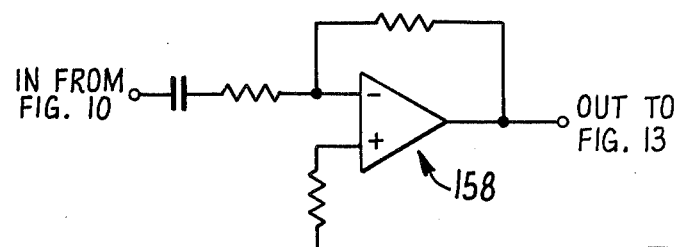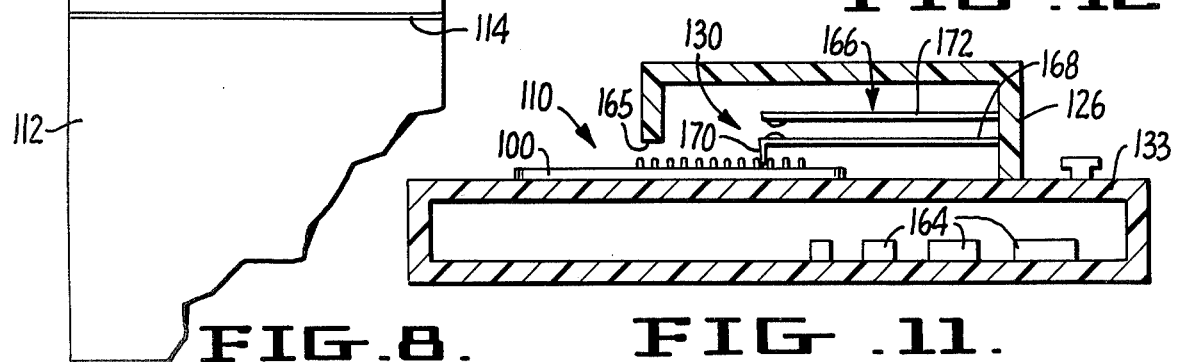

SIGNATURE VERIFICATION AND AUTHENTICATION SYSTEMS

BACKGROUND OF THE INVENTION

1. Field of the Invention

The present invention relates to signature verification and authentication systems whereby to provide security in financial transactions, access to buildings and areas, and the like, and more particularly to methods and apparatus to be employed in such systems, including cryptographically encoded documents, apparatus for producing such documents, and apparatus for utilizing such documents in the verification and authentication of signatures made by authorized users of such documents.

2. Description of the Prior Art

Methods and apparatus for the verification (sometimes miscalled "authentication") of handwritten signatures in order to provide security in financial transactions, access to buildings and areas, and the like, are known in the prior art. Such prior art methods and apparatus are disclosed for example, in the following U.S. Pat. Nos.: 3,676,000 (hereinafter "Mayer-Dobbins '000"); 3,781,109 (hereinafter "Mayer-Dobbins '109"); 3,178,993 (hereinafter "Ferris"); 3,166,625 (hereinafter "Brumley"); 3,955,178 (hereinafter "Warfel"); 3,620,590 (hereinafter "Barker"); 3,579,186 (hereinafter "Johnson"); and 3,806,704 (hereinafter "Shinal").

The systems of these prior art patents all suffer from one of two disadvantages: (1) they involve elaborate and expensive communication networks for the transmission of comparison data, with which to compare signatures on financial documents or identification documents, from data stores located at considerable distances from the points of presentation of the documents, or (2) they provide comparison data cryptographically recorded on documents, whereby signatures made by authorized users thereof may be verified by comparison, but do not provide any means of authenticating the comparison data, i.e., determining whether the comparison data cryptographically recorded on the document was made from an authentic signature of the authorized user of the document.

As will be evident to those having ordinary skill in the art, informed by the present disclosure, the addition to prior art signature verification systems of new comparison data authenticating means, as defined above, provides verification and authentication of signatures on documents, as the terms "verification" and "authentication" are defined in current banking and security practice.

As is also well known to those having ordinary skill in the art, a serious need exists for systems for both verifying and authenticating handwritten signatures of authorized users of documents such as bank checks, savings account passbooks, credit cards, identification cards, and the like, especially in the banking industry where banks and other check processing facilities are faced with the problem of examining many thousands of checks per day and detecting and returning fraudulent checks within a very short period of time, sometimes as little as twenty-four to forty-eight hours. It is anticipated that this burden will be considerably exacerbated in the near future, when certain check processing systems now under test or consideration are adopted by the banking industry. Among these systems are those now called "bulk-filing, cycle-sorting", and "check truncation" or "check safekeeping".

SUMMARY OF THE INVENTION

Accordingly, it is an object of the present invention to provide systems, including methods and apparatus, for both verifying and authenticating signatures made when presenting financial documents, identification documents, and the like without the use of expensive and elaborate communication systems.

A further object of the present invention is to provide improvements in prior art passive signature verification systems, such as those shown and described in Ferris, Brumley, Mayer-Dobbins '000, Mayer-Dobbins '109, and Barker, whereby those prior art passive devices may be adapted for signature authentication as well as signature verification.

Yet another object of the present invention is to provide improvements in prior art active signature verification systems, such as those shown and described in Shinal and Johnson, whereby the stand-alone versions of those prior art systems may be adapted for signature authentication as well as signature verification.

A yet further object of the present invention is to provide financial documents and identification documents adapted for use in both passive and active, stand-alone signature verification and authentication systems.

Other objects of the present invention will in part be obvious and will in part appear hereinafter.

The present invention, accordingly, comprises the several steps and the relation of one or more such steps with respect to each of the others, and the apparatus, including documents, embodying features of construction, combinations of elements, and arrangements of parts which are adapted to affect such steps, all as exemplified in the following disclosure, and the scope of the invention will be indicated in the appended claims.

In accordance with a principal feature of the present invention, financial documents, identification documents, or the like bear a cryptograph in which a cryptographic representation of one or more properties of an authorized document user's signature and a representation of one or more indicia identifying the user with the document are merged or otherwise combined so that the representation of said indicia cannot be separated from the cryptographic representation of the signature by dissection of the document without detectably altering the decoded version or decryptment of the cryptograph.

In accordance with another principal feature of the present invention, said document identifying indicia are reproduced en clair, or in unencrypted form, on the document bearing the corresponding cryptograph.

In accordance with yet another principal feature of the present invention, said cryptograph will sometimes take the form of a predetermined collocation of symbols, e.g., MICR characters or the bar code representation 23, 24 of Shinal (FIG. 3), and the indicia identifying the user with the document, or some predetermined part thereof, will constitute a key to the encryptment of said property or properties.

In accordance with a further principal feature of the present invention, in systems in which one or more properties of the authorized document user's signature are represented by a matrix of code elements, such as the elements 35 of Johnson, this matrix does not directly represent the values of such properties, but rather represents a predetermined recollocation of a direct matrix representation of said properties, at least some of said indicia being a key to the recollocation of said direct matrix representation.

In accordance with a yet further principal feature of the present invention, said matrix may be a matrix of relatively opaque and relatively transparent elements, representing binary 1 and binary 0, respectively, and in this case the predetermined recollocation of the elements of the matrix directly representing said properties of the authorized signature may be accomplished in accordance with a route transposition cipher, or an electronic computer analog of a cardano grille, to which said one or more indicia serve as a key.

In accordance with a still further principal feature of the present invention, when such a cryptographic matrix is made up of a plurality of elements the transmissivities of which are selected from a plurality of transmissivity levels greater than two, as in the unencrypted matrices disclosed in U.S. Pat. No. 4,066,910, the encryptment of the corresponding matrix directly representing said properties may be accomplished by systematically changing the transmissivity of each element by one or more levels.

For a fuller understanding of the nature and objects of the present invention reference should be had to the following descriptions of illustrative embodiments, taken in connection with the accompanying drawings.

BRIEF DESCRIPTION OF THE DRAWINGS

FIG. 1 is a vertical sectional view of a device for producing a photographic film record of cryptographs to be recorded on corresponding documents and used in verifying and authenticating signatures of authorized users thereof in accordance with the principles of the present invention;

FIG. 2 is a vertical sectional view of a device which may be used for signature verification and authentication in accordance with the principles of the present invention;

FIG. 3 fragmentarily illustrates a signature card which may be used in the device of FIG. 1 in practicing one embodiment of the present invention;

FIG. 4 fragmentarily illustrates a signature card which may be used in the device of FIG. 1 in practicing another embodiment of the present invention;

FIG. 5 fragmentarily illustrates a signature card which may be used in the device of FIG. 1 in practicing yet another embodiment of the present invention;

FIG. 6 illustrates a document embodying certain teachings of the present invention and adapted for use in a semi-automatic signature verifying and authenticating system constructed in accordance with the present invention; and FIGS. 7 through 14 schematically represent said semi-automatic system for the verification and authentication of signatures.

Referring now to FIG. 1, there is shown a photographic encrypting device 10 which can be used in a passive signature verification and authentication system embodying the present invention.

As seen in FIG. 1, encrypting device 10 comprises a camera 12 mounted in the upper end of a housing 14. A transfer lens 16 is mounted within housing 14, with its optical axis aligned with the axis of the optics of camera 12. A shutter 18 is located between transfer lens 16 and camera 12. Transfer lens 16 and shutter 18 are affixed to the lower, open end of a hollow sheet metal light box 20. The upper end of light box 20 is light-tightly affixed to the upper end of housing 14.

Figure 13:
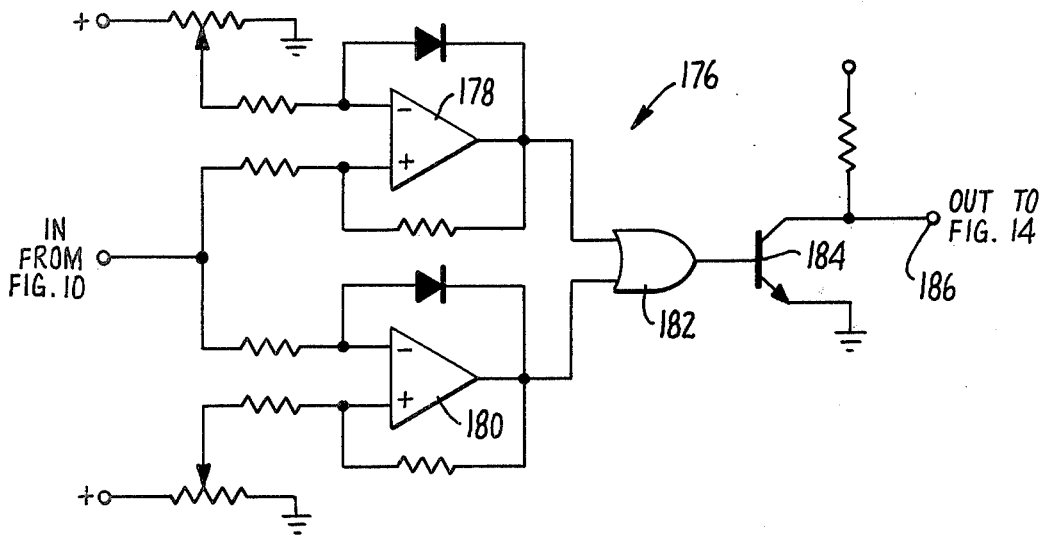

As also shown in FIG. 1, a shutter release cable 22 is provided for operating shutter 18 from outside housing 14, the manually operable control means 24 at the end of shutter release cable 22 being mounted in an opening in a vertical wall of housing 14.

An encoding lens array 28 is mounted in an opening in a horizontal partition 30, as shown in FIG. 1. Horizontal partition 30 is affixed in light-tight manner to all four vertical walls of housing 14. Unitary encoding lens array 28 is a fly's eye lens of the type shown and described in Mayer-Dobbins '109, and is mounted with its lenticles disposed downwardly as seen in FIG. 1. (The encrypting device 10 of FIG. 1 is shown and described in detail in Mayer-Dobbins '109, and reference should be had thereto for details of encrypting device 10 not shown or described herein.)

Below horizontal partition 30 and substantially parallel thereto are mounted signature card holding means generally referred to by the reference numeral 32, the function of which will now be described.

Signature card holding means 32 are adapted to maintain a signature card 34 parallel to unitary encoding lens array 28, and spaced therefrom at such a distance that when signature card 34 is suitably illuminated, and shutter control 24 is operated, an encrypted image of the matter on the upper surface of signature card 34 will be produced on the film in camera 12. As taught in Mayer-Dobbins '109, a suitable opening is provided in a vertical wall of housing 14 whereby signature card 34 may be removed from signature card holding means 32, and a series of other signature cards successively mounted therein in its stead, so that encrypted images of the matter on the upper surfaces of each of the cards of said series can be photographed seriatim on the film in camera 12. Suitable incandescent or fluorescent lamps 36, 38, 40, 42 are provided in housing 14 for directly illuminating or transilluminating signature cards mounted in signature card holding means 32, or both.

A suitable method for reproducing the successive encrypted images on the film from camera 12 on corresponding bank checks or other documents is described and shown in detail in Mayer-Dobbins '109.

In the presently described illustrative embodiment of the present invention the successive encrypted signature card images on the film from camera 12 will be assumed to be reproduced at the upper right hand corners of corresponding pluralities of bank checks, which bank checks generally resemble the bank check shown in FIG. 10 of Mayer-Dobbins '109. It is to be understood, however, that in employing the encrypting device 10 of FIG. 1 to practice the teachings of the present invention, as more fully described hereinbelow, each encrypted signature card image photographed on the film in camera 12 is a cryptographic representation of a signature of an authorized drawer (user) of the corresponding checks, modified in accordance with at least one symbol of an account code designation identifying the checks with the authorized drawer or user thereof.

Modes of incorporating a representation of the account code number of a bank check into a signature cryptograph imprinted thereon, in accordance with the teachings of the present invention, will be described hereinbelow in connection with FIGS. 3 through 5. It is to be understood, however, that while the present illustrative embodiments make use of a fly's eye lens array of the kind shown and described in Mayer-Dobbins '109, other encrypting lens arrays may be used in carrying out the teachings of the present invention. For instance, encrypting lens arrays and lens array pairs of the kind shown and described in Ferris and Brumley may be employed in carrying out the teachings of the present invention, provided that suitable changes are made in the lens spacings and mounting means of the encrypting device, etc., and in some cases additional lenses are provided, all as will be within the scope of one having ordinary skill in the art in view of the teachings of Ferris and Brumley. Further, crossed arrays of full field width, parti-cylindrical lenses may be used in carrying out the teachings of the present invention.

It is further to be understood that the present invention also contemplates the encryptment of more than one signature on a document.

Referring now to FIG. 2, there is shown a decrypting device 48 which may be used in carrying out the teachings of the present invention. This decrypting device is shown and described in detail in Mayer-Dobbins '109, and will be described herein only to the extent necessary to cleary disclose several illustrative embodiments of the present invention.

As seen in FIG. 2, decrypting device 48 comprises a unitary decrypting lens array 50, corresponding to encrypting lens 28, which is closely juxtaposed to a bank check 52. Bank check 52 is held in place by spring-loaded clamping means particularly described in Mayer-Dobbins '109, and not shown herein. Bank check 52 is so juxtaposed to decrypting lens array 50 that the encrypted image from the film in camera 12 which is reproduced at its upper right hand corner directly confronts decrypting lens array 50. Lamps 54 and 56 are provided for transilluminating bank check 52, or any other bank check substituted in its place. It is to be understood, however, that suitable means for directly illuminating the front faces of bank checks clamped in position by said clamping means may be provided by those having ordinary skill in the art without the exercise of invention.

As will be evident to those having ordinary skill in the art, informed by the present disclosure and Mayer-Dobbins '109, an observer looking into opening 64 in the smaller end of housing 66, through lenses 60, 62, will see the signature made by the authorized drawer (user) on the signature line of bank check 52, and will also see, through decrypting lens array 50 and lens 58, the drawer's signature as it appears on the signature card used in making the encrypted image which is reproduced on bank check 52.

In accordance with the teachings of the present invention, the signature verification system of Mayer-Dobbins '109 (described supra to the extent necessary for clear understanding of the present invention) may be adapted to signature authentication, in addition to signature verification, as follows.

Referring now to FIG. 3, there is shown the matter 70 appearing on the signature card 34 of FIG. 1. It is assumed that the bank checks on which the encrypted version of signature card matter 70 is to be reproduced will bear the account code number 69134208 in MICR (magnetic ink character recognition) characters, as part of the magnetic ink character recognition stripe of each of them. In accordance with the teachings of the present invention, the signature 72 of an authorized drawer (user) of these checks, John D. Depositor, coincides with a representation 74 of said account code number 69134208, i.e., account code number representation 74 is superimposed on signature 72, or signature 72 is superimposed on account code number representation 74.

Because signature 72 and account code number representation 74 are thus made coincident, in accordance with the teachings of the present invention, it will be evident to those having ordinary skill in the art that the cryptographic representation of signature card matter 70 as reproduced on said correspondingly account code numbered checks will comprise a plurality of irregularly shaped elements, a first plurality of which will represent parts of signature 72, and a second plurality of which will represent parts of account code number representation 74. It will also be evident that the elements of said first and second pluralities will be to some extent intersperced. In addition, some of said elements may represent parts of both signature 72 and account code number representation 74. Thus, it will be seen that in accordance with the principles of the present invention the cryptographic representation of signature card matter 70 on said correspondingly account numbered checks will be a composite cryptograph in which the authorized drawer's signature and the corresponding account code number representation are mutually inextricably incorporated, to such an extent that a forger or bank fraud in attempting to produce a counterfeit check incorporating the account code number of a "dummy" account of his own in the same bank and the composite cryptograph from a genuine one of said correspondingly account code numbered checks, would be foiled by his inability to extract the representation 74 of the correct account code number, 69134208, from the composite cryptograph by any simple method, such as dissection of a genuine account number 69134208 check.

It will now be recognized by those having ordinary skill in the art, as taught by the present specification and drawings, that the teachings of the present invention are by no means restricted in their useful application to bank checks. Rather, it will be evident that the teachings of the present invention are equally applicable to other financial documents, such as savings account passbooks, credit cards and debit cards, identification cards, and official documents, such as passports and national identity cards.

While the above-described passive embodiment of the present invention employs the mode of signature card signature modification illustrated in FIGS. 3, it is to be understood that many other modes of signature card signature modification, and corresponding signature modifying means, than the mode illustrated in FIG. 3, and the corresponding signature modifying means 74, fall within the scope of the present invention.

Thus, a passive embodiment of the present invention may be provided which employs the mode of signature card signature modification, and the signature modifying means, illustrated in FIG. 4.

Going to FIG. 4, it will be seen that the signature modifying means is a plurality of sets 76 of binary code bars 78. As will be evident to those having ordinary skill in the art, the respective patterns of code bars 78 corresponding to the different account code number digits 0 through 9 are determined in accordance with a simple excess-3, four-bit binary code arrangement. For example, the code bar pattern corresponding to the digit 6 is a pair of bars located in the two extreme bar positions, because the corresponding excess-3 number, i.e., 9, consists of the extreme four-bit binary digits "1" and "8".

As seen in FIG. 4, the code bars 78 not only pass through the signature 80 but also pass through the corresponding "box-eight" numerals 82. By this means it is made possible to easily recognize by eye, using the decrypting device of FIG. 2, for example, when an attempt is being made to pass a "cut-and-paste" forgery made from of a genuine check and a check drawn on a "dummy" account as described hereinabove, while at the same time the account code numbers on the signature card and in the decryptions of the cryptographs on the corresponding checks do not overlap the signature, thus reducing confusion in signature comparison.

As will now be evident, such a "cut-and-paste" forgery will be characterized, when viewed by means of the decrypting device, by breaks and misalignments in the code bars 78.

Going to FIG. 5, there is illustrated yet another mode of signature card signature modification of a simple but effective kind in which the account code number digits 84 are closely juxtaposed to the main body of signature 86. As will be evident to those having ordinary skill in the art, familiar with the operation of fly's eye lenses and other unitary encrypting lens arrays, the cryptographic representation produced by the encrypting device of FIG. 1 will include irregularly shaped elements which correspond to parts of account code number 84 interspersed with irregularly shaped elements which correspond to parts of signature 86, and thus it will be very difficult if not impossible to dissect the cryptographic representation in such a way as to leave a section which when decrypted by the device of FIG. 2 will show only signature 86 and nothing of account code number 84, or vice versa.

Referring now to FIG. 6, there is shown a credit card 100 which embodies certain teachings of the present invention, and which is adapted for use in a handwritten signature verification and authentication system embodying certain teachings of the present invention, illustrated in FIGS. 7 through 14. This handwritten signature verification and authentication system is a modification of the stand-alone handwritten signature verification system shown in FIGS. 3 through 11 of Shinal, modified to incorporate the signature authentication feature of the present invention. Thus, it will be understood that the handwritten signature verification and authentication system shown in FIGS. 6 through 14 of the present drawings constitutes many parts, combinations of parts, etc., which are common to the handwritten signature verification system of FIGS. 3 through 14 of Shinal, and reference should be had to Shinal for a more particular description of such common parts, combinations of common parts, etc., than is found herein.

Referring again to FIG. 6, and comparing it with the corresponding figure of Shinal, FIG. 3, it will be seen that credit card 100 generally resembles Shinal's credit card 13, differing therefrom in the following particulars.

Credit card 13 of Shinal bears two rows of digital information embossments, one of which rows is a clock row or clock track, and the other of which is an information row or information track.

The clock row or clock track 23 of Shinal consists of eight uniformly spaced embossments, whereas the clock row or clock track 102 of credit card 100 consists of twelve uniformly spaced embossments.

Assuming that a simple binary code is used on information track 24 of Shinal, and that the least significant bit is the rightmost bit, the number encoded in Shinal's information track 24 is 186, expressed in decimal form, which is the numerical value of the signature of the authorized user, i.e., holder, of credit card 13 of Shinal.

By contrast, and assuming the same simple binary code to be used on the information track 104 of credit card 100, it will be seen that the number represented by the embossments on information track 104 is 1177, in decimal form.

It is further to be noted that the account code designation 106, i.e., 376-456-9XX1-72, found on credit card 100 is the same as the account code designation 21 found on credit card 13 of Shinal.

It is assumed throughout this description of the embodiment of FIGS. 6 through 14, unless otherwise noted, that the holder of credit card 100 is the same person as the holder of credit card 13 of Shinal, and that thus the numerical signature value corresponding to credit card 100 is the same as the numerical signature value corresponding to credit card 13 of Shinal, i.e., 186.

Credit card 100 differs from credit card 13 of Shinal, however, in that the numerical signature value 186 is not directly represented on credit card 100, but rather is represented on credit card 100 in encrypted form. That is to say, the numerical singature value 186 must be determined from the number on information track 104 of credit card 100, i.e., 1177, by decrypting the number 1177 in accordance with a predetermined decrypting algorithm or routine.

It is assumed throughout this description of the embodiment of FIGS. 6 through 14, unless specifically noted otherwise, that this decrypting algorithm or routing consists in (1) adding together the individual hyphen-separated groups of numbers, i.e., 372, 456, 91, and 72, of which account code designation 106 is comprised, and (2) subtracting the resulting sum, i.e., 991, called the "key" or "key number" of the credit card of FIG. 6, from the number represented by the embossments of information track 104, i.e., 1177, giving the numerical signature value 186 in the case of credit card 100.

It is further assumed that all of the credit cards issued for use in the credit card system disclosed in connection with FIGS. 6 through 14 will be encoded in accordance with the same routine or algorithm. For instance, another credit card of the system of the embodiment of FIGS. 6 through 14 might have the corresponding numerical signature value 79, and the account code designation 372-508-9XX5-72. The number represented in the information track of this card would be 1126.

In general, then, all of the credit cards issued in connection with the particular embodiment of the present invention shown in FIGS. 6 through 14, and described in connection therewith, will have represented in their information tracks the sum of the holder's numerical signature value and the sum of the hypen-separated number groups (ignoring letters) of the holder's account code designation.

It is further to be understood, however, that the particular mode of encryptment of the numerical signature value used in the credit card system of the embodiment of FIGS. 6 through 14 will not be employed in other credit card systems embodying the teachings of the present invention. For instance, the encrypting algorithm or routine used in another credit card system of the present invention than that of FIGS. 6 through 14 may use as its key number only the leftmost two digits of each hyphen-separated number group of its account code designation. Thus, if the account code designation of a credit card of this other system is 512-306-803-21-34, the corresponding key number, derived from this account code designation by the first step of its corresponding algorithm or routine, will be 216. If the numerical signature value corresponding to this credit card is 255, and the second step of the encrypting algorithm or routine is the same as the second step of the encrypting algorithm or routine of the embodiment of FIGS. 6 through 14, the number represented by the information track of this credit card will be 471.

As will be evident to those having ordinary skill in the art, informed by the present disclosure, the encrypting algorithm or routine of this first alternative system can be carried out by the same decrypting means which is shown and described in connection with the embodiment of FIGS. 6 through 14, the only major change from the system of FIGS. 6 through 14 being in the numbers represented on the information tracks of the credit cards of this first alternative system.

Many other cryptologic credit card systems, embodying the present invention but not employing the decrypting means of the embodiment of FIGS. 6 through 14, will be provided by those having ordinary skill in the art, informed by the present specification and drawings, without the exercise of invention.

Alternatives which will be provided by those having ordinary skill in the art without the exercise of invention will include multiplying by a key number derived from the account code designation, rather than subtracting that key number; or selecting from among a number of different "suppressed constants" in a stored "lexicon" in accordance with the numerical value of the key number, or some predetermined part thereof. All such alternatives will be provided by those having ordinary skill in the art without the exercise of invention.

In addition, those having ordinary skill in the art, without the exercise of invention, will also provide alternative embodiments in which the account code designations on the credit cards of the system are represented in machine-readable characters, e.g., MICR, OCR-A or CMC-7 characters, and the hyphen-separated number groups are read by well-known machine-readable character reading means, rather than being entered into the algorithm calculation by means of a keyboard operated by the clerk at the point of sale. In these essentially fully automatic systems it may be necessary to replace the hyphens in the account code designation on each credit card by one or more letters of the alphabet other than those found in the account code designation itself, not only because some of the known machine-readable character fonts do not include a hyphen, but also because in executing some algorithms it will be necessary to carry out more than one kind of arithmetic operation, and thus each such operation will necessarily be designated by one of said "extra" letters.

Referring now to FIG. 7, there is shown a block diagram of the sales slip holder and cardholder identifier 110 of FIG. 8. (Sales slip holder and cardholder identifier 110 is a modification of the sales slip holder and cardholder identifier of FIGS. 4 through 11 of Shinal, whereby the teachings of the present invention are incorporated into the sales slip holder and cardholder identifier of FIGS. 4 through 11 of Shinal. Thus, only the new parts added to the device of FIGS. 4 through 11 of Shinal to incorporate the teachings of the present invention therein will be described in detail herein.) Both the sales slip holder and cardholder identifier of Shinal's FIG. 5 and the sales slip holder and cardholder identifier of FIG. 8 herein will be designated by the term "identifier" hereinafter.

Before referring to the detailed description of identifier 110 as set out hereinbelow, the mode of using identifier 110 at the point of sale or point of presentation of credit card 100 will now be described.

When credit card 100 is presented in connection with the purchase of goods or services the clerk pivots a keyboard cover 112 about its hinge 114, thereby disclosing keyboard 116 and display 118. The clerk then strokes the proper keys of keyboard 116 to enter into the associated calculator circuit the hyphen-separated groups of digits of account code designation 106, i.e., 372-456-91-72. It is to be particularly noted that in thus entering the decimal digit groups of account code designation 106 key 120 is a hyphen key and not a minus key. (The fact that key 120 is actually a plus key, in the ordinary pocket calculator sense, is concealed from the clerk by the fact that it is designated a hyphen key in his instructions, which, may, for instance, be imprinted on the inside of hinged cover 112. In addition, for further security, keyboard 116 is not provided with the usual equals key, but rather is provided with E or END key 122, which serves the same function as the usual equals key. In accordance with a preferred embodiment of identifier 110, END key 122 and hyphen key 120 both operate a simple network whereby to suppress the displaying of the accumulator contents, so that the clerk cannot deduce that what he is doing is taking the sum of the hyphen-separated digit groups of the account code designation.

Keyboard 116 is also provided with a clear key 124, and the clerk is instructed, as on the inside of hinged cover 112, to operate the clear key only at the time of the *next* transaction.

In accordance with another preferred feature of the present invention, the clear key is made to operated a simple additional circuit whereby to reset the accumulator display suppressing circuit of END key 122 and hyphen key 120, whereby the clerk will be able to check on his entry of the individual digit groups on the next credit card presented.

Having entered the digit groups of account code designation 106, and having depressed END key 122, but not CLEAR key 124, the clerk closes hinged cover 112, thereby concealing keyboard 116 from the cardholder, and providing a handrest for himself and the cardholder.

The clerk then inserts credit card 100 into a slot in the left side of reader housing 126. Reader housing 126 and the card reader 130 contained therein are shown in FIG. 11 and described hereinbelow in connection therewith.

After inserting credit card 100 in reader housing 126, the clerk then mounts a sales slip 132 on a set of four studs 134, 136, 138, and 140.

The clerk then records the purchase transaction on sales slip 132, and hands identifier 110 to the cardholder, requesting that the cardholder sign his name on line 142.

As best seen in FIG. 9, the area in which the cardholder signs his name is an encoder area, specially adapted for producing electrical output signals characteristic of the cardholder's signature while the cardholder is making his signature.

As shown in FIG. 9, the encoder area comprises a hollow 144 in the base 133 of identifier 110. A conductive surface 146 is contained in hollow 144. Sales slip 132 is multilayered, and is formed so that the bottom of the lowest layer is made of a conductive material having a fixed and definite eletrical resistance.

As indicated in FIG. 10, one terminal of a battery 148 is connected to the conductive bottom layer of sales slip 132, and the other terminal of battery 148 is connected through a resistor 150 to conductive surface 146.

As will be understood from FIG. 9, the lower, conductive layer of sales slip 132 is normally maintained separated from conductive surface 146 by the restraining action of studs 134, 136, 138, and 140. In keeping with the terminology of Shinal, the circuit of FIG. 10 will be called herein the "encoder", and will be designated by the reference numeral 152. When the cardholder signs his name on line 142 (FIG. 8), the pressure of the writing causes sales slip 132 to be deflected downwardly so that the conductive layer of sales slip 132 touches conductive surface 146. Conductive surface 146 serves to short circuit a varying portion of the bottom sheet of sales slip 132 as the writing instrument moves over different portions of sales slip 132, changing the resistance of the encoder circuit to the flow of current from battery 148. As the point of the writing instrument moves toward the upper edge of the sales slip 132 the point at which sales slip 132 touches conductive surface 146 changes, the resistance of the encoder circuit decreases, and the current flowing through load resistor 150 increases. As the writing instrument moves toward the bottom edge of the sales slip 132, the resistance of the encoder circuit increases, decreasing the flow of current through load resistor 150. This modulation of the current from battery 148 produces a voltage drop across load resistor 140 which varies in time in the same manner as the motion of the writing instrument. This varying potential is taken from encoder 152 via terminals 154 and 156, and is applied to the differentiator 158 and amplifier 160 shown in FIG. 7.

Referring now to FIG. 11, the card reader 130 in housing 126 (FIG. 5) will now be described.

As seen in FIG. 11, identifier base 133, at least in the card reader area, has a hollow interior in which are contained the electronic devices and other components 164 of the identifier system. Housing 126 is preferably integral with base 133, and is provided with an opening 165 to receive card 100. Contained within housing 126 is a plurality of leaf switches 166, only one of which is shown. The leaf switch which is shown comprises an arm 168 of resilient material, such as metal spring material, with a wedge-shaped cam follower 170 at one end and with the other end attached to the side wall of housing 126. A second arm 172 is relatively rigid and has one end also attached to the side wall of housing 126. The two arms 168, 172 have individual contacts affixed to their outer ends, these contacts being positioned in complementary relation to one another. A pair of wires connect the two arms 168, 172 to electrical components 164 contained within the hollow interior of base 133.

As credit card 100 is inserted into opening 165 a "card" switch (not shown) is closed, producing a "card" signal (FIG. 14), and then the raised digit embossments of information track 104 (FIG. 6) encounter cam follower 170, forcing arm 168 to retreat upwardly as cam follower 170 passes over each digit embossment of information track 104. As each digit embossment, or perhaps more correctly bit embossment, passes cam follower 170, arm 168 returns to its normal position. When arm 168 is forced upwardly its contact touches the contact at the outer end of arm 172, applying an electrical pulse to the appropriate component 164. Another switch similar in substantially all respects to switch 168 is contained in housing 126 and coacts with the bit embossments of clock track 102 (FIG. 6). These two reading switches are positioned so that as card 100 is inserted one of the switches responds to clock track bit embossments and the other responds to information track bit embossments. In this manner, the speed with which the card is inserted in immaterial to the operation of the device, for the use of the clock digits (or bits) insures that each digit (or bit) position will be read, and that the end digit position will be unequivocally identified. In view of the above, the manner of reading clock track 104 and information track 102 of card 100 and producing electrical pulse signals as a result thereof will be easily understood, and reference is had to Shinal for further details of the reading process.

Referring again to FIG. 7, amplifier 160 may be any standard amplifier which has suitable characteristics for the purpose, and such an amplifier will be selected by one having ordinary skill in the art without the exercise of invention.

A suitable circuit for differentiator 158 is shown in FIG. 12, and described in detail in Shinal. Reference should be had to FIG. 9 of Shinal and the text of Shinal related thereto for further details of the circuit of instant FIG. 12.

As further seen in FIG. 7, the output of differentiator 158 is applied to a zero crossover detector 176 after amplification. For a detailed description of zero crossover detector 176 reference is had to FIG. 13. In general, crossover detector 176 comprises a pair of differential amplifiers 178, 180, and an OR gate 182 whose output is applied to the base electrode of a transistor 184. The collector electrode of transistor 184 is directly connected to an output terminal 186.

As will be evident to those having ordinary skill in the art, the cooperation of differentiator 158 and zero crossover detector 176 serve to produce at terminal 186 pulses each of which represents one of the peaks of the signature made by the cardholder. Reference is had to FIG. 10 of Shinal and the text of the Shinal specification related thereto for further details of the zero crossover detector 176.

Returning to FIG. 7, it will be seen that the identifier circuit further comprises an accumulator circuit 190 and a signal circuit 192. Both of these circuits are shown in FIG. 14.

Figure 14:
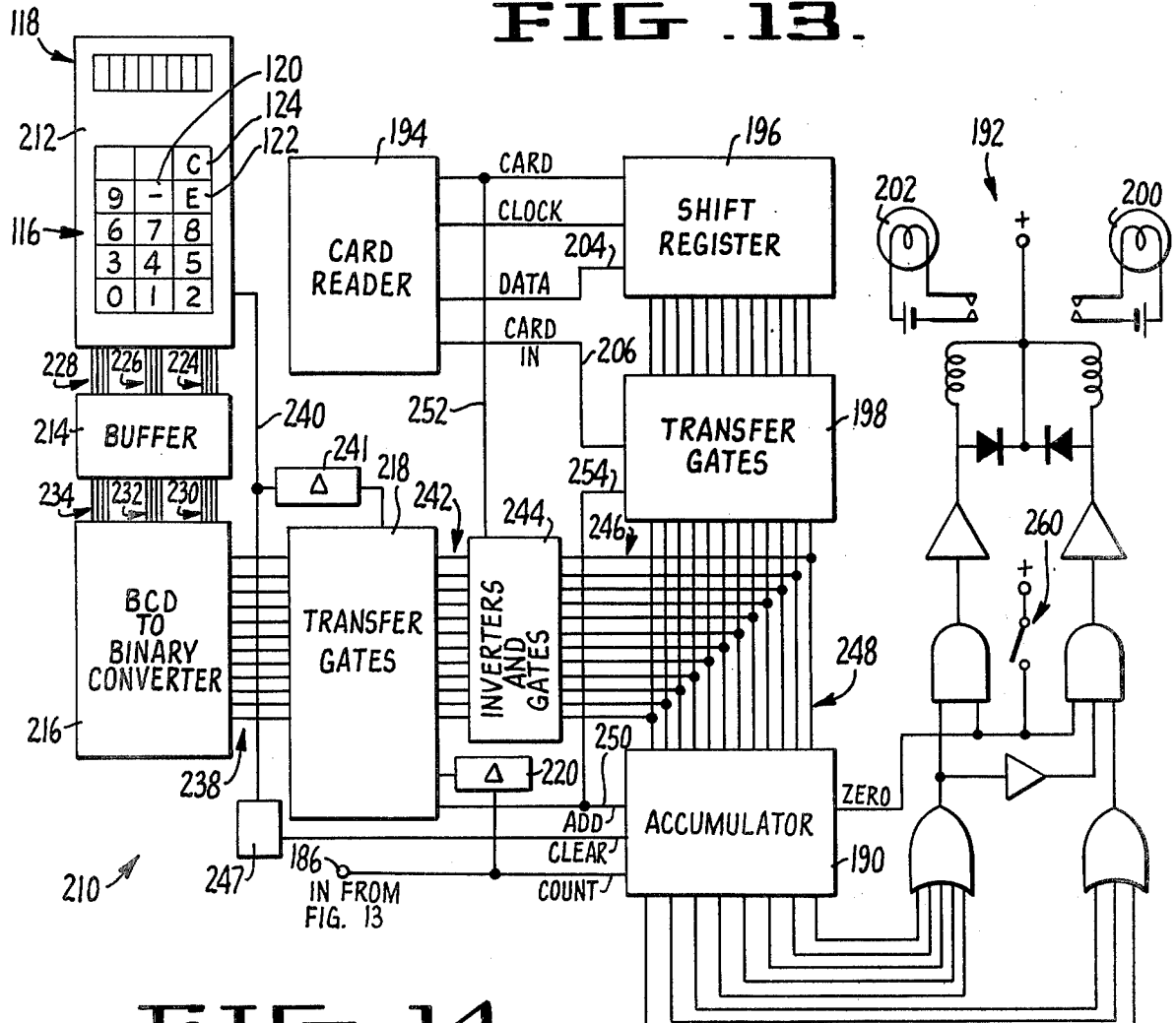

Referring to FIG. 14, it will be seen that the hereinabovedescribed card reader (FIG. 11) is denoted by a rectangle 194. In addition to card reader 194 and signal circuit 192, FIG. 14 also shows two other principal elements which are shown and described in detail in Shinal, viz., shift register 196 and transfer gate bank 198. Shift register 196, transfer gate bank 198, and signal circuit 192 are described in detail in Shinal, and reference should be made thereto for detailed description of these circuits and their manner of interconnection and cooperation. It should be noted, however, that for the purpose of incorporating the present invention into the device of Shinal Shinal's shift register 196 and transfer gate bank 198, and their interconnections, have been changed to 12-bit elements, rather than the 8-bit elements of Shinal, such modification being well within the scope of one having ordinary skill in the art without the exercise of invention.

Further it should be noted that Shinal's counter 104 (FIG. 11) has been replaced by an accumulator 190, which may be of the logical type discussed at pages 230 through 233 of *Automatic Digital Computers*, by M. V. Wilkes, John Wiley and Sons., Inc., New York, 1957, of which see particularly FIG. 6.27.

Comparing FIGS. 8 and 14, it will also be seen that the output signal lights 200, 202 of FIG. 14 are located in the upper surface of identifier base 133, where they can be observed by both the cardholder and the clerk.

(It should be noted here that in the operation of the device of Shinal the numerical signature value information from card reader 16 (FIG. 11) is inserted into shift register 101 (FIG. 11) via the data line (FIG. 11) until the full numerical signature value signal is in shift register 101, as indiciated by the closing of the "card in" switch (not shown), and the consequent signal on the "card in" line. This signal on the "card in" line operates transfer gates 102 (FIG. 11) to bring about parallel entry of the contents of shift register 101 into counter 104. Counter 104 is then counted down in accordance with signals from the zero crossover detector of FIG. 10, producing an acceptance or rejection signal which actuates Shinal's signal circuit, and thus lights one of the lights 122 or 123. Reference should be had to Shinal for further details of the acceptance-rejection operation of the circuit of Shinal.)

Referring again to FIG. 14, there is shown, in addition to the circuits common to the embodiment of FIGS. 4 through 11 of Shinal, or analogous thereto, a plurality of cooperating circuits which together serve to incorporate certain teachings of the present invention into said embodiment of Shinal. This plurality of cooperating circuits will be called the "decryptor" herein, and designated by the reference numeral 210.

Decryptor 210 comprises an arithmetic circuit 212, a buffer circuit 214, a binary-coded-decimal-to-binary converter circuit 126, a transfer gating circuit 218, an end-around-carry insertion circuit 220, a complementing and gating circuit 244, and interconnections for interconnecting these circuits, and interconnecting them with the circuits of the identifier of FIG. 14 which are common with or analogous to circuits of the identifier of FIGS. 4 through 11 of Shinal.

As seen in FIG. 4, arithmetic circuit 212 comprises keyboard 116 and numerical display 118, both of which are shown in FIG. 8 and discussed hereinabove. Keyboard 116 includes, in addition to decimal number entry keys, the HYPHEN key 120, END key 122, and CLEAR key 124, the respective functions of which are discussed in detail hereinabove in connection with FIG. 8.

Arithmetic circuit 212 may, for example, be a programmable calculator chip or integrated circuit of well-known type, which internally processes numerical information in binary-coded-decimal (BCD) form. Such integrated circuit chips are available from custom integrated circuit manufacturers, modified to incorporate such minor function changes as are attributed to the ENTER key 122, the HYPHEN key 120, and the CLEAR key 124 hereinabove. Further, such custom integrated circuit manufacturers can provide, as a matter of routine customer engineering well within the scope of those having ordinary skill in the art, output leads from the input terminals of the display segment decoders of such programmable calculator chips, on which leads BCD electrical signals corresponding to the numbers displayed on the associated LED or liquid crystal display appear. (As a matter of sound engineering practice, the custom integrated circuit manufacturer may prefer to provide output terminals for access to such leads; but in either event sets of leads carrying BCD electrical signals representing the digits displayed on the associated display can be made available in custom-made programmable calculator chips provided by custom integrated circuit manufacturers within the scope of ordinary skill in that art.)

Such sets of leads, whether including integrated circuit chip output terminals or otherwise, will hereinafter be called "BCD display number leads", and such leads will be provided in groups of four leads per display order. Thus, there may be provided four "least-significant-digit-binary-coded-decimal" signal leads, or "LSDBCD" leads, four "least-significant-digit-but-one-binary-coded-decimal" signal leads, or "LSD-1BCD" leads, etc.

Referring again to FIG. 14, it will be seen that three sets of leads 224, 226, 228 extend from arithmetic unit 212 to buffer circuit 214. These lead sets are the LSDBCD, LSD-1BCD, and LSD-2BCD lead sets, respectively, of the programmable calculator chip of arithmetic unit 212, and carry the BCD electrical signals supplied to display 118 which correspond to the three least significant digits thereof.

That is to say, the contents of the accumulator register in the programmable calculator chip, or rather the three lowest order thereof, are electrically represented on lead sets 224, 226, 228 even when the operation of display 118 is suppressed by the operation of the ENTER key 122 and HYPHEN key 120 as noted above in connection with FIG. 8.

While the arithmetic unit 212 is assumed hereinabove to be a custom integrated circuit of a kind readily provided by custom integrated circuit manufacturers without the exercise of invention, it is also within the scope of those having ordinary skill in the art to provide a discrete component circuit having the same functional properties and characteristics by the use of well-known techniques and circuits, such as are shown and described in detail in U.S. Pat. No. 3,546,676, issued to Robert A. Ragen on Dec. 8, 1970.

Buffer circuit 214 is an isolating circuit of the well-known kind used to avoid reaction between a driving circuit and a driven circuit, in this case arithmetic unit 212 and BCD-to-decimal converter 216.

Converter circuit 216 is a BCD-to-decimal converter circuit of a well-known type, such as the type disclosed at pages 139 through 154 of *Designing With TTL Integrated Circuits*, prepared by the IC Applications Staff of Texas Instruments, Inc., and published by McGraw-Hill Publishing Company, New York, 1971. As seen in FIG. 14, the same signals provided to buffer 214 on signal line sets 224, 226, 228 are in turn supplied to converter 216 via signal line sets 230, 232, 234.

Converter 216 provides the straight binary equivalent of the BCD numbers successively represented on lead sets 230, 232, 234, on the 12-bit binary output lines 238.

The transfer gates 218 of FIG. 14 are similar in circuit configuration to the transfer gates 198, which are in turn similar in circuit configuration to the transfer gates 102 of Shinal (FIG. 11). The transfer gates are opened by a delayed version of the signal on line 240, which is itself produced only when END key 122 is depressed, and is discontinued when CLEAR key 124 is depressed. The signal on line 240 corresponds to the signal produced in response to the depression of key 122, and used as a condition of suppressing the operation of display 118.

The delay of the signal thus applied to transfer gates 218 with respect to the signal on line 240 is produced by delay circuit 241, of well-known type.

As will now be understood by those having ordinary skill in the art, informed by the present disclosure, transfer gates 218 are open and thus signals appear on the 12-bit output leads 242 of transfer gates 218 when and only when the ENTER key 122 has been depressed, but the CLEAR key 124 has not yet been depressed, and the delay produced by delay circuit 241 has not ended. The signals which appear on lines 242 will be a 12-bit binary representation of the three least significant digits displayed on display 118.

Referring again to FIG. 14, it will be seen that the signals on lines 242 are applied to a bank of inverters 244 and corresponding gates. As will be evident to those having ordinary skill in the art, the inverters 244 serve to produce on the 12-bit lines 246 signals representing the base-minus-one complement, or ones-complement of the binary number represented by the signals on bit lines 242.

It shoulld be noted at this point that due to the action of delay circuit 241 transfer gates 218 are not opened until after accumulator 190 is cleared, i.e., set to 000000000000 by means of a pulse applied to its CLEAR input terminal by a pulse-shaping circuit 247, which receives its input signals from line 240.

Since the 12 bit lines 246 are respectively connected to the 12 bit lines 248 which provide parallel inputs to accumulator 190, it follows that the ones-complements represented by sets of signals on the bit lines 246 will be added to the contents, then zero, of accumulator 190 whenever a suitable add pulse is received by accumulator 190. This add pulse is supplied to accumulator 190 from transfer gate bank 218 via line 250. The add pulse signal on line 250 may, for instance, be a pulse produced by an RC network which receives the signal on line 240, as delayed by delay circuit 241, and produces a significant pulse only in response to the leading edge of the delayed version of the signal on line 240. It may be advisable to pass the output pulse from said RC network through a short time delay network, so that the resulting add pulse on line 250 is delayed until the carries in accumulator 190 have "settled down".

In addition to entering the ones-complement represented on bit lines 246 into accumulator 190, it is also necessary to add a single pulse, i.e., bit in the lowest order, to the number stored in accumulator 190, for reasons which will be obvious to those having ordinary skill in the art. This end-around-carry insertion is accomplished by a circuit 220, which is supplied with input pulses by said RC network, and which includes a delay network which serves to delay the production of end-around-carry pulses on the count (first order incoming carry digit) input of accumulator 190 until after the ones-complement represented on bit lines 248 has been fully entered into accumulator 190 and all carries have "settled down".

In addition to producing the ones-complement signals on bit lines 246, the inverter and gate circuit 244 also serves to terminate the existence of the ones-complement signals on bit lines 246 in response to a CARD or "card in slot" signal on line 252, supplied by card reader 194 in the manner taught by Shinal. The necessary gates for performing this function, which are part of the inverter and gate network 244, will be provided by those having ordinary skill in the art without the exercise of invention.

As will now be evident to those having ordinary skill in the art, informed by Shinal and the present disclosure, the full insertion of credit card 100 into reader 194 will result in the loading into shift register 196 of the digital data recorded on information track 104 of credit card 100. The opening of transfer gates 198 by the "card in" signal on line 206, resulting from complete insertion of credit card 100 into the credit card reader, will in turn result in the application of electrical signals representing the data recorded on information track 104 to the parallel bit input leads 248 of accumulator 190.

After the appearance of the information track data on parallel input leads 248, a delayed add pulse signal is applied to accumulator 190 via lead 254, and thus the information track data is added to the ones-complement of the sum of the hyphen-separated digit groups of the account code designation 106 of credit card 100, it being assumed that this data has been manually inserted by the clerk as described hereinabove. The end-around-carry has already been added to the contents of accumulator 190, as described hereinabove. It follows, then, based on the well-known principles of binary subtraction by adding the ones-complement and an end-around-carry, that the contents of accumulator 190 will now be equal to the result of carrying out the first above-described decrypting algorithm or routine, i.e., the contents of accumulator 190 will be the numerical value of the signature of the holder of credit card 100.

If then, the number of pulses received from zero crossover detector 176 via count input terminal 186 drives accumulator 190 through zero and on to a count of between one and seven, and switch 260 is operated by the clerk, "YES" light 200 will light, and otherwise "NO" light 202 will light, for the reasons given by Shinal in his columns 9 and 10. For this action to take place, the numerical signature value on information track 104 of credit card 100 must equal the complement of the empirical signature value originally taken by means of an encoder like FIG. 10, plus an arbitrary weighting factor, all as explained by Shinal in his columns 9 and 10.

It will now be obvious to one having ordinary skill in the art how the decrypting algorithms of the second and subsequent embodiments described above may be implemented, as by an auxiliary input network connected to lines 248, and properly gated, for adding a "suppressed term" into accumulator 190 before the signature count is entered into the count terminal 186 of accumulator 190, or by providing a plurality of such networks, each providing a different "suppressed term" which terms are selectively added into accumulator 190 in response to some aspect of the account code designation keyed into keyboard 116.

While the numerical signature value in encrypted form is borne by credit card 100 in the form of binary digital embossments in information track 104, it is to be understood that within the scope of the present invention the encrypted numerical signature value may also be borne by credit card 100 in the form, e.g., of MICR characters, OCR-A characters, or the like, or in the form of magnetic stripes on which the encrypted numerical signature value is magnetically recorded in conventional style, or in the manner taught in U.S. Pat. No. 2,989,595, issued to Jonathan Hunter on June 20, 1961. The encrypted numerical signature value may also be borne within credit card 100, e.g., in the manner taught in U.S. Pat. No. 4,066,910, issued to David M. Swift on Jan. 3, 1978. In addition, the encrypted numerical signature value may be borne within credit card 100 in the manner taught in U.S. Pat. No. 3,245,697, issued to Warren J. Nugent on Apr. 12, 1966.

As an example of apparatus for reproducing on a document a cryptograph to be used in verifying and authenticating a signature of an authorized user thereof, a standard and well-known device for "writing" on the magnetic stripes of so called MAGSTRIPE credit cards may be modified to incorporate the two mutually-angulated heads 23, 29 of FIG. 4A of the above-cited Hunter patent, and binary-coded information representative of the encrypted numerical signature value may be supplied to head 23 while it and head 29 are "writing" a signature information track and a clock track on the same MAGSTRIPE on a MAGSTRIPE version of credit card 100. The decryptor for such a credit card of the present invention will, of course, comprise a corresponding pair of reading heads as taught in the Hunter patent, rather than mechanical switch readers of the kind used in the abovedescribed embodiment of FIGS. 6 through 14.

Alternatively, a credit card of the present invention, corresponding to credit card 100, may bear the information contained in track 104 of FIG. 6 within it, placed there by the method of card making taught in the above-mentioned Swift patent, in which case the corresponding decryptor will comprise a reader of the kind taught in the Swift patent.

Credit card making means and reading means whereby the alternative technologies of the above-cited patents may be incorporated in the system of the present invention will be provided by those having ordinary skill in the art without the exercise of invention.

As will now be obvious to those having ordinary skill in the art, in view of the above teachings, the present invention can be incorporated into the system of Barker by replacing the PIN number "25" in the hologram 18 of Barker with all or part of Barker's identification number 16, viz., "1-234-87", so that the hologram patterns representative of the signature are so inextricably intertwined or incorporated with the hologram patterns representative of the identification number that these patterns cannot be separated by mere dissection of hologram 18. It is to be particularly noted that Barker teaches that the provision of his identification number 16, i.e., document identifying indicium, is purely "conventional"; and further teaches that the two-digit number incorporated into his hologram 18 "is specifically chosen and memorized by the authorized bearer", i.e., is what is sometimes called a "PIC number" or a "PIN number". In other words, one having ordinary skill in the art would be led by Barker in precisely the opposite direction from the teachings of the present invention.

It will now be obvious to those having ordinary skill in the art, informed by the above disclosure, how the teachings of the present invention may be incorporated into the stand-alone version of the automatic signature verification apparatus of Johnson. That is to say, in incorporating the teachings of the present invention into the stand-alone system of Johnson the coded signature information 35 (FIG. 3) borne by Johnson's card 33 in the form of an internal matrix of "transparent" and "opaque" areas, will be enciphered by redistribution in accordance with a pattern, such as a well-known route transposition cipher, to which one or more of the numerals of Johnson's embossed account data constitutes a key. Alternatively, different cards may have their internal matrices enciphered in accordance with different route transposition cipher patterns. Having thus modified the cards of Johnson, it is within the scope of one having ordinary skill in the art to provide several alternative wiring patterns leading from the photocells 47 to the card reader circuit 49 of FIG. 4 of Johnson, the particular photocell pattern for each card being manually switch-selected or automatically selected in accordance with certain digits of the embossed account data 34 on Johnson's card and their corresponding route transposition cipher patterns. By this application of the principles of the present invention to the system of Johnson it is rendered difficult if not impossible for the forger to substitute a central encoded layer in a card issued to him for the central encoded layer in a card issued to another and successfully present his card as the card of the other.

Definitions

The term "document" is used herein in its broadest acceptation, to denote anything which carries or can carry data or other information in any form of representation or notation. Thus, the term "document" as used herein includes within its embrace, but is not limited to, any body of material substance, such as a card or paper, and envelope, a carton, a container, a book or pamphlet, a plate, a credit card, a debit card, an identification card, a passport, a national identity card, or an identification badge, having on it a representation or any numerical or linquistic data or any other pattern.

The term "cryptograph" is used herein in its broadest acceptation, to denote any pattern or indicium, whether symbolic or graphic, having a hidden significance, and thus embraces all of the concepts and things embraced by the term "cryptoeidograph". Thus, the term "cryptograph" as used herein embraces not only modified writings having hidden meanings, but also embraces modified or distorted patterns having hidden meanings, such as a hologram, or the mosaical anamorphosis of a handwritten signature shown in FIG. 9 of Mayer-Dobbins '000. Thus, the term "cryptograph" as used herein embraces all of the cryptographic representations made by and used in cryptographic systems of the kind described at pages 828 through 836 of *The Codebreakers,* by David Kahn, published by the Macmillan Company, New York, 1967, Fourth printing, 1968.

Thus, it will be seen that the term "cryptographic" as used herein denotes anything related to or used in the making or interpreting of cryptographs, including cryptoeidographs and ciphers.

The term "encrypt" as used herein denotes the making of a cryptograph, as the term cryptograph is defined hereinabove. Thus, the term "encrypt" as used herein denotes the making of any cipher from any unmodified, i.e., clear or plain, text or other writing, having apparent significance, and the making of any cryptoeidograph of an unmodified, plain, or clear pattern having apparent significance.

The term "decrypt" as used herein is used antonymously with respect to the term "encrypt".

Thus, the term "decrypt" as used herein denotes the recovering of an unmodified, clear or plain, writing or other text, having apparent significance, from a cipher or other symbolic cryptograph, and also denotes the recovering of an unmodified, clear or plain, pattern having apparent significance from a cryptoeidographic pattern.

The term "encryption" as used herein denotes the process of encrypting and the results thereof.

The term "decryption" as used herein denotes the process of decrypting and the results thereof.

The term "indicium" is used herein in the conventional sense, and thus embraces any pattern composed of a plurality of indicia.

The term "pattern" is used herein in its broadest acceptation to denote anything which is to be or is fit to be copied or imitated.

It will thus be seen that the objects set forth above, among those made apparent from the preceding description, are efficiently attained, and since certain changes may be made in the above constructions and the method carried out thereby or therewith without departing from the scope of the present invention it is intended that all matter contained in the above descriptions or shown in the accompanying drawings shall be interpreted as illustrative only, and not in a limiting sense.

It is also to be understood that the following claims are intended to cover all of the generic and specific features of the invention hereindescribed, and all statements of the scope of the invention which, as a matter of language, might be said to fall therebetween.

What is claimed is:

1. A method of signature verification and authentication comprising the step of reproducing on a document a cryptographic representation of at least one property of a signature of an authorized user thereof modified in accordance with at least one indicium identifying said user with said document.

2. A method of signature verification and authentication, comprising the steps of:
   reproducing on a document indicia identifying said document with an authorized user therof; and
   reproducing on said document a cryptographic representation of at least one property of a signature of said authorized user modified in accordance with at least one of said indicia.

3. A method of signature verification and authentication as claimed in claim 2 in which said indicia are the symbols of an account code designation.

4. A method of signature verification and authentication as claimed in claim 2 in which said indicia are the symbols of a personal identification code designation.

5. A method of signature verification and authentication as claimed in claim 2, further comprising the steps of:
   decrypting said cryptographic representation of at least one property of a signature of said authorized user, using said at least one of said indicia as a key; and
   comparing said at least one property of a signature of said authorized user with at least one corresponding property of a signature made by said authorized user when using said document.

6. A method of signature verification and authentication as claimed in claim 5 in which said indicia are the symbols of an account code designation.

7. A method of signature verification and authentication as claimed in claim 6 in which said signature made by said authorized user when using said document is made on said document.

8. A method of signature verification and authentication as claimed in claim 7 in which said document is a bank check and said authorized user is a drawer thereof.

9. A method of signature verification and authentication as claimed in claim 5 in which said indicia are the symbols of a personal identification code designation.

10. A method of signature verification and authentication as claimed in claim 9 in which said document is an identification card.

11. A method of signature verification and authentication as claimed in claim 9 in which said document is a credit card.

12. A method of signature verification and authentication as claimed in claim 2 in which said at least one property of a signature of said authorized user is a cryptographic transformation of said signature.

13. A method of signature verification and authentication as claimed in claim 12, further comprising the steps of:
   decrypting said cryptographic transformation of said signature, using said at least one of said indicia as a key; and
   comparing said signature as decrypted with a signature made by said authorized user when using said document.

14. A method of signature verification and authentication as claimed in claim 13 in which said signature made by said authorized user when using said document is made on said document.

15. A method of signature verification and authentication as claimed in claim 14 in which said document is a bank check and said authorized user is a drawer thereof.

16. A method of signature verification and authentication as claimed in claim 2 in which said at least one property of a signature of said authorized user is a dynamic property thereof.

17. A method of signature verification and authentication as claimed in claim 16 in which said document is an identification card.

18. A method of signature verification and authentication as claimed in claim 16 in which said document is a credit card.

19. A method of signature verification and authentication as claimed in claim 2 in which said cryptographic representation consists of a plurality of symbols resulting from the modification in accordance with said at least one of said indicia of a plurality of symbols representing said at least one property of a signature of said authorized user.

20. A method of signature verification and authentication as claimed in claim 2 in which said cryptographic representation is a collocation of elements having diverse optical properties resulting from the recollocation in accordance with said at least one of said indicia of a collocation of such elements representing said at least one property of a signature of said authorized user.

21. A method of signature verification and authentication as claimed in claim 2 in which said cryptographic representation is a hologram of said signature of said authorized user and said at least one of said indicia.

22. Signature verification and authentication apparatus comprising cryptographic means for decrypting a cryptographic representation borne by a document of at least one property of a signature of an authorized user of said document, modified in accordance with at least one of a plurality of indicia identifying said document with said user.

23. Signature verification and authentication apparatus as claimed in claim 22 in which said cryptographic means comprises a multi-lenticular optical array.

24. Signature verification and authentication apparatus as claimed in claim 23 in which said multi-lenticular optical array is a substantially regular array composed of substantially congruent optical elements.

25. Signature verification and authentication apparatus as claimed in claim 22, further comprising reading means for reading said at least one of a plurality of indicia and providing signals for controlling the operation of said cryptographic means in accordance therewith.

26. Signature verification and authentication apparatus as claimed in claim 25 in which said at least one property of a signature of an authorized user is a dynamic property thereof.

27. Signature verification and authentication apparatus as claimed in claim 25 in which said at least one property of a signature of an authorized user is a cryptographic transform thereof.

28. Signature verification and authentication apparatus as claimed in claim 27 in which said cryptographic transform is a hologram.

29. Signature verification and authentication apparatus as claimed in claim 22, further comprising comparing means for comparing said at least one property of a signature of said authorized user with at least one corresponding property of a signature made by said authorized user when using said document.

30. Signature verification and authentication apparatus as claimed in claim 29 in which said signature made by said authorized user when using said document is made on said document.

31. Signature verification and authentication apparatus as claimed in claim 30 in which said document is a bank check.

32. Signature verification and authentication apparatus as claimed in claim 29 in which said document is a passbook.

33. Signature verification and authentication apparatus as claimed in claim 29 in which said document is a credit card.

34. Signature verification and authentication apparatus as claimed in claim 29 in which said document is an identity card.

35. Apparatus for reproducing on a document a cryptograph to be used in verifying and authenticating a signature of an authorized user thereof, comprising:
cryptographic means for producing said cryptograph; and
modifying means for modifying the operation of said cryptographic means in accordance with at least one of a plurality of indicia identifying said document with said authorized user.

36. Apparatus as claimed in claim 35 in which said cryptographic means comprises a multi-lenticular optical array and said modifying means comprises a representation of said at least one of a plurality of indicia.

37. Apparatus as claimed in claim 36 in which said representation of said at least one of a plurality of indicia is in part coincident with a representation of a signature of said authorized user.

38. Apparatus as claimed in claim 35 in which said modifying means comprises a representation of at least one graphic symbol representing said at least one of a plurality of indicia and said at least one symbol coincides in part with a representation of a signature of said authorized user and a representation of the corresponding one of said indicia.

39. A document, bearing:
indicia identifying said document with an authorized user thereof; and
a cryptographic representation of at least one property of a signature of said user modified in accordance with at least one of said indicia.

40. A document as claimed in claim 39 in which said indicia are the symbols of an account code designation.

41. A document as claimed in claim 39 in which said indicia are the symbols of a personal identification code designation.

42. A document as claimed in claim 39 in which said at least one property of a signature is a count of the number of points at which that signature changes direction.

43. A document as claimed in claim 39 in which said at least one property of a signature is a dynamic property of said user's mode of writing said signature.

44. A document as claimed in claim 39 in which said at least one property of a signature is a cryptographic transformation thereof.

45. A method of signature verification and authentication as claimed in claim 1 in which said cryptographic representation is a cryptoeidograph of a composite image consisting of a representation of said signature and a representation of said at least one indicium merged therewith.

46. A method of signature verification and authentication as claimed in claim 2 in which said cryptographic representation is a cryptoeidograph of a composite image consisting of a representation of said signature and a representation of said at least one of said indicia merged therewith.

47. Signature verification and authentication apparatus as claimed in claim 22 in which said cryptographic representation is a cryptoeidograph of a composite image consisting of a representation of said signature and a representation of said at least one of a plurality of indicia merged therewith.

48. Apparatus as claimed in claim 35 in which said cryptograph is a cryptoeidograph of a composite image consisting of a representation of said signature and a representation of said at least one of a plurality of indicia merged therewith.

49. A document as claimed in claim 39 in which said cryptographic representation is a cryptoeidograph of a composite image consisting of a representation of said signature and a representation of at least one of a plurality of indicia merged therewith.

50. A method of signature verification and authentication, comprising the steps of:
reproducing on a document indicia identifying said document with an authorized user thereof;
reproducing on said document a unitary cryptograph of a representation of at least one property of a signature of said authorized user modified in accordance with at least one of said indicia so that any decryption of a part only of said unitary cryptograph will be detectably different from said modified representation;
decrypting said cryptograph; and
comparing said representation with a corresponding representation of a signature made by said authorized user when using said document.

51. A method of signature verification and authentication as claimed in claim 50 in which said indicia are the symbols of an account code designation.

52. A method of signature verification and authentication as claimed in claim 51 in which said signature made by said authorized user when using said document is made on said document.

53. A method of signature verification and authentication as claimed in claim 52 in which said document is a bank check and said authorized user is a drawer thereof.

54. A method of signature verification and authentication as claimed in claim 50 in which said indicia are the symbols of a personal identification code designation.

55. A method of signature verification and authentication as claimed in claim 54 in which said document is an identification card.

56. A method of signature verification and authentication as claimed in claim 54 in which said document is a credit card.